Oct. 1, 1957 A. F. ERWIN 2,808,002
LINEAR ELECTROMAGNETIC PUMP HAVING CONCENTRIC FLUID PASSAGES
Filed Nov. 16, 1953
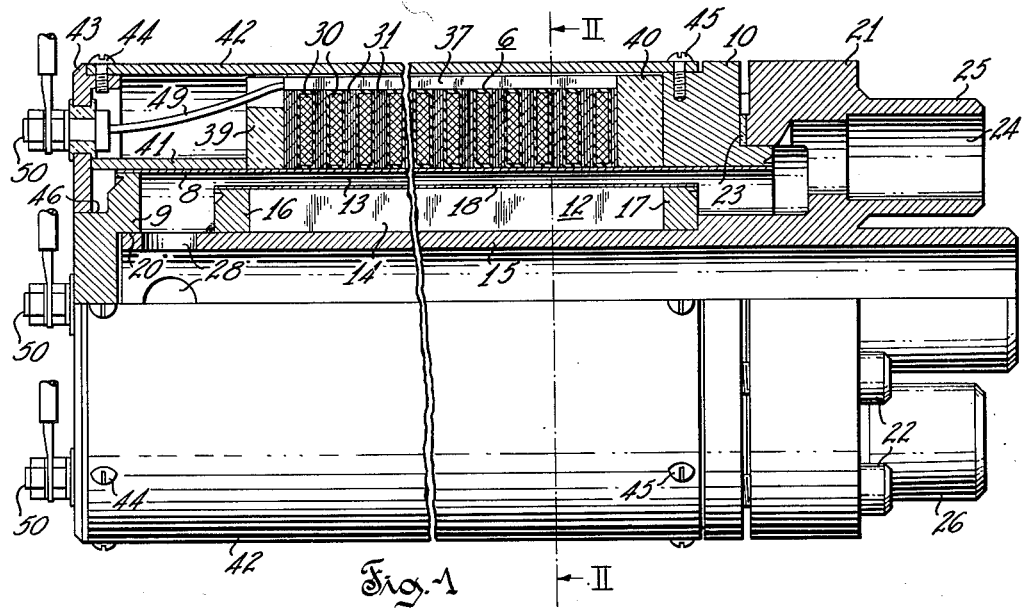
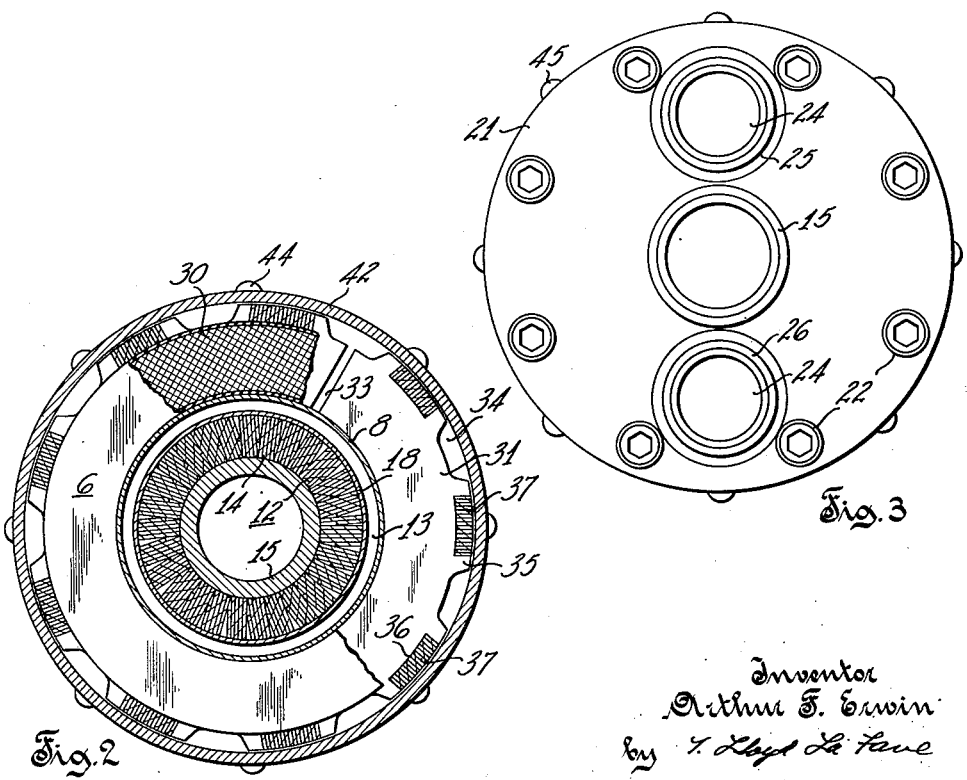
Inventor
Arthur F. Erwin
by F. Lloyd La Fave
Attorney

2,808,002

LINEAR ELECTROMAGNETIC PUMP HAVING CONCENTRIC FLUID PASSAGES

Arthur F. Erwin, Oconomowoc, Wis., assignor to Allis-Chalmers Manufacturing Company, Milwaukee, Wis.

Application November 16, 1953, Serial No. 392,087

3 Claims. (Cl. 103—1)

This invention relates to a linear alternating current electromagnetic pump and more particularly to such a pump employing annular electric coils.

A linear alternating current electromagnetic pump, having annular electric coils, as heretofore constructed, comprises a straight through conduit or tube about which the coils are disposed. The annular coils cannot be replaced without removing the pump from its hydrualic circuit in order to slip the coils on or off the conduit. Moreover, in pumps having straight through conduits, flexible joints or connections were provided to compensate for thermal expansion and contraction of the conduit. Such joints have been a source of trouble, developing breaks and leaks at the welds.

According to the present invention, the linear alternating current electromagnetic pump comprises two conduits with one disposed within the other. The two conduits are connected hydraulically in series to provide inlet and outlet at one end of the pump. This arrangement permits an annular member such as an annular coil to be replaced by removal or insertion of the coil over the closed end of the outer conduit at the other end of the pump. One of the conduits is arranged to expand and contract relative to the other without use of any flexible connection and without danger of any fluid leaks resulting therefrom.

It is therefore an object of this invention to provide a linear alternating current electromagnetic pump permitting replacement of a continuous coil surrounding a conduit which is connected in a hydraulic circuit, without disconnecting the conduit from the hydraulic circuit.

Another object is to provide a linear alternating current pump permitting axial expansion and contraction of a conduit containing fluid to be pumped, without use of flexible joints or seals.

Another object is to provide a linear alternating current electromagnetic pump which is economical to make and which has electric coils which may conveniently be replaced.

Other objects and advantages of this invention will be apparent from the following description taken with the accompanying drawing, in which:

Fig. 1 is a view in elevation and partly in transverse cross section of a linear alternating current electromagnetic pump embodying the invention;

Fig. 2 is a view of the pump taken along the line II—II of Fig. 1 with a portion thereof broken away; and Fig. 3 is an end view showing the fluid inlet and outlet of the pump shown in Fig. 1.

Referring to the drawing, a dynamoelectric machine is shown which is operable as a motor for pumping electrically conductive fluid through first and second conduits extending through the machine. The second conduit is disposed within the first conduit with means connecting the conduits hydraulically in series so that fluid flowing through the pump flows in one direction through one conduit and in the opposite direction through the other conduit.

The first conduit comprises a primary magnet member 6 disposed about a tube 8 containing fluid of relatively low ohmic resistance such as a sodium-potassium alloy. Tube 8 is preferably round and made of nonmagnetic material having relatively high ohmic resistance such as stainless steel. The tube is not chemically reactive with the fluid. A steel disk 9 is secured as by welding to one end of tube 8 to make a fluid tight cap closing that end of the tube. The other end of tube 8 extends through an annular steel ring 10 and is secured in fluid tight relation therewith as by welding.

The second conduit comprises a secondary magnet member such as a hollow iron core 12. The iron core comprises axially and radially extending laminations 14 mounted on a rigid tube 15 preferably of nonmagnetic stainless steel. Laminations 14 are confined between end rings 16, 17 suitably secured to tube 15 as by welding. A thin tube 18 also of stainless steel encloses laminations 14 and has its ends secured to end rings 16, 17. Iron core 12 and tube 18 are disposed concentrically within tube 8 to define an annular chamber 13 therebetween.

Tube 15 has one end supported within an annular shoulder 20 formed by a shallow bore in end plate 9, permitting relative axial movement between the end of tube 15 and end plate 9 to take up differences in their axial expansions and contractions. The other end of tube 15 extends through a plate 21 in fluid tight relation therewith by being integral or rigidly secured thereto by welding. Plate 21 may be secured to ring 10 by welding or preferably removably secured thereto by circumferentially spaced axially extending bolts 22. Bolts 22 when tightened draw ring 10 and plate 21 together confining insulation washer 23 therebetween. Tube 15 is longitudinally secured with respect to tube 8 at only one end through ring 21 and plate 10. Tubes 15 and 8 may therefore expand differentially of one another. Plate 21 has one or more apertures 24 for connecting an external fluid system to the annular chamber 13 between the concentric tubes. These apertures are axially extended by suitable hollow projections serving as pipe couplings 25, 26 extending from the plate. These pipe couplings may be connected by suitable means to a common pipe (not shown) for connection to a fluid system externally of the pump.

Annular chamber 13 provides a passage for fluid flow in one direction axially through the pump. A plurality of holes 28 through the wall of tube 15 in the end portion between plate 9 and the iron core 12 provide means connecting annular chamber 13 with the axial duct provided by tube 15 for fluid flow in the opposite direction axially through the tube 15. The other end portion of tube 15 and apertures 24 define inlet and outlet ports at the same end of the pump. Fluid flow through chamber 13 may be in either axial direction, but it is preferably to the right so that apertures 24 serve as the outlet or discharge of the pump.

Means for causing fluid flow through chamber 13 includes primary magnet member 6 having windings surrounding tube 8. The windings comprise a plurality of form wound annular coils 30 axially slipped over the closed end of tube 8. Coils 30 are axially spaced by groups of annular laminations 31 made of magnetic material disposed alternately with coils 30 on tube 8.

Each annular lamination 31 has a radial slit 33 to make the lamination discontinuous so that the lamination does not provide an annular path for induced currents. Laminations 31 extend radially outward beyond coils 30. These radially outer portions are scalloped and arranged to provide axially aligned spaces 34 for the passage of coil leads. Peripheral teeth 35 are formed by these portions and have axially aligned slots 36 in which a plurality of circumferentially spaced longitudinally extending slot sticks 37 are disposed. The slot sticks are made of laminated magnetic material with the laminations extending longitudinally of the sticks. The sticks are disposed in the slots with one edge of each lamination engaging the bottom of the slot.

Coils 30 and laminations 31 are axially confined between insulating spacer rings 39, 40. Spacer 40 abuts the shoulder on tube 8 formed by end ring 10. A spacer sleeve 41 disposed over the closed end of tube 8 abuts insulating spacer 39 and reenforces the thin walled tube 8. An end ring 43 is disposed with its inner periphery on an annular shoulder 46 of end plate 9. A tubular housing 42 cooperates with end rings 10 and 43 to enclose the primary magnet member 6 and hold ring 43 against the end of spacer sleeve 41. Tubular housing 42 is removably secured to end rings 10 and 43 by suitable means such as circumferentially spaced bolts 44, 45. Means including bolts 45 and housing 42 thus secure the primary member 6 to tube 8 in only one plane radially of tube 8. This permits differential expansion due to heating of the primary member 6 and tube 8 causing relative sliding therebetween. With such expansion end plate 9 and ring 43 move axially of each other.

The coils are connected together in any suitable known manner with terminal leads 49 passing through apertures in spacer ring 39 and suitably connected to terminals 50 having studs extending through end ring 43 for connection to a source of polyphase current. The coils are preferably interconnected like the windings of a three phase induction motor for connection to a source of three phase current (not shown).

In the operation of the pump, the three phase current source is connected to terminals 50. Each coil when energized produces flux linking the coil with the flux flowing in a path radially outward in the annular laminations on one side of the coils, across the outer periphery of the coil in laminated slot sticks 37, radially inward through the annular laminations on the other side of the coil, radially across chamber 13 forming a gap in the magnetic circuit to laminated iron core 12, axially in core 12, and then radially back across the chamber to the annular laminations on the one side of the coil. The difference in phase of the currents in adjacent coils is such that the radial magnetic field produced moves in one direction axially of the coils and of the conduits. This direction may be reversed by reversing the connections for any two of the terminals. The radial field moving axially to the right forces the fluid in chamber 13 axially to the right as is well known.

As constructed and arranged, the primary magnet member 6 may be replaced without removing the pump from the hydraulic circuit. Laminations 31 and coils 30 can be removed axially over the closed end of tube 8 by removing bolts 45 securing housing 42 to ring 10.

Although but one embodiment of the invention is shown and described, it will readily be apparent to one skilled in the art that changes may be made therein without departing from the spirit of the invention or from the scope of the appended claims.

It is claimed and desired to secure by Letters Patent:

1. A linear alternating current electromagnetic pump for an electrically conductive fluid, said pump comprising an annular primary magnetic member and an annular secondary magnetic member disposed coaxially within said primary member to form an annular chamber therebetween, means at a first end of said pump connecting said annular chamber and said annular secondary member to a hydraulic circuit of electrically conductive fluid, an end member integral with said annular primary magnetic member rigidly closing said member at a second end of said pump, said end member presenting an axially extending annular surface slidably supporting said secondary magnetic member at said second end of said pump, means hydraulically connecting said annular secondary member to said chamber at a second end of said pump to provide a series hydraulic path through said pump, and means producing an axially moving radial magnetic field between said primary and said secondary members to force said fluid in said chamber axially in one direction through said pump.

2. A linear alternating current electromagnetic pump for an electrically conductive fluid, said pump comprising a first conduit, a second conduit having an annular magnetic core disposed coaxially within said first conduit to provide an annular chamber therebetween, means at a first end of said pump connecting said second conduit and said chamber to a hydraulic circuit of electrically conductive fluid, an end member integral with said first conduit rigidly closing said first conduit at a second end of said pump, said second conduit having an end portion including means hydraulically connecting said second conduit and said annular chamber at said second end of said pump to provide a series path through said pump, said end member presenting an axially extending annular surface slidably supporting said end portion to permit differential expansion between said first and second conduits, means producing an axially moving radial magnetic field in said chamber to force said fluid therein to flow axially of said pump.

3. A linear alternating current electromagnetic pump for an electrically conductive fluid, said pump comprising a first annular member, a second annular member having an annular magnetic core disposed coaxially within said first annular member to provide an annular chamber therebetween, means at a first end of said pump connecting said second annular member and said chamber to a hydraulic circuit of electrically conductive fluid, an end member integral with said first member rigidly closing said first member at a second end of said pump, said second member having an end portion including means hydraulically connecting said second member and said annular chamber at said second end of said pump to provide a series path through said pump, said end member presenting an axially extending annular surface slidably supporting said end portion of said second member, annular coils and laminations mounted on said first member, means energizing said coils to produce an axially moving radial magnetic field in said annular chamber to force said fluid therein to flow axially of said pump, said annular coils and laminations being axially removable from the second end of said first annular member without removing said pump from said hydraulic circuit.

References Cited in the file of this patent

UNITED STATES PATENTS

| | | |
|---|---|---|
| 2,645,279 | Rossmann | July 14, 1953 |
| 2,658,452 | Donelian | Nov. 10, 1953 |
| 2,669,183 | Godbold | Feb. 16, 1954 |
| 2,669,931 | Godbold | Feb. 23, 1954 |
| 2,702,004 | Blake et al. | Feb. 15, 1955 |

FOREIGN PATENTS

| | | |
|---|---|---|
| 534,214 | Germany | Feb. 3, 1932 |